(12) United States Patent
Park et al.

(10) Patent No.: US 9,829,076 B2
(45) Date of Patent: Nov. 28, 2017

(54) PLANETARY GEAR TRAIN OF AUTOMATIC TRANSMISSION FOR VEHICLES

(71) Applicant: Hyundai Motor Company, Seoul (KR)

(72) Inventors: JongSool Park, Hwaseong-si (KR); Sueng Ho Lee, Seoul (KR); Dong Hwan Hwang, Seoul (KR); Seong Wook Hwang, Gunpo-si (KR); Seongwook Ji, Ansan-si (KR); Wonmin Cho, Hwaseong-si (KR); Hyun Sik Kwon, Seoul (KR); KyeongHun Lee, Seoul (KR); Jong Soo Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 103 days.

(21) Appl. No.: 14/948,271

(22) Filed: Nov. 21, 2015

(65) Prior Publication Data

US 2017/0074369 A1    Mar. 16, 2017

(30) Foreign Application Priority Data

Sep. 14, 2015  (KR) .......................... 10-2015-0129868

(51) Int. Cl.
*F16H 3/62* (2006.01)
*F16H 3/44* (2006.01)
*F16H 37/06* (2006.01)
*F16H 3/66* (2006.01)

(52) U.S. Cl.
CPC ....... *F16H 3/66* (2013.01); *F16H 2200/0065* (2013.01); *F16H 2200/2012* (2013.01); *F16H 2200/2046* (2013.01)

(58) Field of Classification Search
CPC ................. F16H 2200/2012; F16H 2200/2046
See application file for complete search history.

(56) References Cited

U.S. PATENT DOCUMENTS 8,142,325 B2    3/2012 Phillips et al.
9,500,263 B2 *  11/2016 Ogauchi .................. F16H 3/66
(Continued)

FOREIGN PATENT DOCUMENTS

JP    2014-500462 A    1/2014
KR   10-2012-0132021 A   12/2012

*Primary Examiner* — Tisha Lewis
(74) *Attorney, Agent, or Firm* — Morgan, Lewis & Bockius LLP

(57) ABSTRACT

A planetary gear train of an automatic transmission for vehicle may include an input shaft; an output shaft; first to fourth planetary gear sets and six control elements disposed at a portion selectively connecting the rotation elements and the rotation elements or a portion selectively connecting the rotation elements and the transmission housing, wherein the input shaft is continuously connected to the third rotation element, the output shaft is continuously connected to the eleventh rotation element, the second rotation element is continuously connected to the eleventh rotation element, the third rotation element is continuously connected to the fourth rotation element, the sixth rotation element is continuously connected to the eighth rotation element, the ninth rotation element is continuously connected to the tenth rotation element, the fifth rotation element is selectively connected to the transmission housing.

10 Claims, 2 Drawing Sheets

(56) References Cited

U.S. PATENT DOCUMENTS

2009/0118062 A1\* 5/2009 Phillips .................. F16H 3/666
 475/276
2010/0210402 A1\* 8/2010 Phillips .................. F16H 3/666
 475/275
2015/0111688 A1 4/2015 Beck et al.

\* cited by examiner

FIG. 2

| Speed stages | Control elements ||||||  Gear ratio | Ratio between stages | Span of gear ratio |
|---|---|---|---|---|---|---|---|---|---|
| | B1 | B2 | B3 | C1 | C2 | C3 | | | |
| D1 |  | ● | ● |  | ● |  | 5.653 | - | |
| D2 |  |  | ● | ● | ● |  | 3.430 | 1.648 | |
| D3 |  | ● | ● | ● |  |  | 2.235 | 1.535 | |
| D4 |  |  | ● | ● |  | ● | 1.625 | 1.375 | |
| D5 |  | ● |  | ● |  | ● | 1.227 | 1.324 | 9.2 |
| D6 |  |  |  | ● | ● | ● | 1.000 | 1.227 | |
| D7 |  | ● |  |  | ● | ● | 0.880 | 1.136 | |
| D8 | ● |  |  |  | ● | ● | 0.743 | 1.184 | |
| D9 | ● | ● |  |  |  | ● | 0.613 | 1.212 | |
| REV | ● | ● | ● |  |  |  | -4.157 | - | - |

PLANETARY GEAR TRAIN OF AUTOMATIC TRANSMISSION FOR VEHICLES

CROSS-REFERENCE TO RELATED APPLICATION

The present application claims priority to and the benefit of Korean Patent Application No. 10-2015-0129868 filed on Sep. 14, 2015, the entire contents of which is incorporated herein for all purposes by this reference.

BACKGROUND OF THE INVENTION

Field of the Invention

The present invention relates to an automatic transmission for a vehicle. More particularly, the present invention relates to that improves power delivery performance and fuel consumption and obtains a linearity between step ratios of transmission steps by enlarging a span of gear ratios while achieving nine forward speed stages using a minimum number of constituent elements.

Description of Related Art

The recent increase in oil prices causes carmakers to meet global demands of improving fuel efficiency.

Accordingly, researches are being conducted on engines in terms of reducing weight and improving fuel efficiency by down-sizing, and researches are also being conducted to ensure both drivability and competitiveness by maximizing fuel efficiency by implementing an automatic transmission with multiple stages.

However, in the case of the automatic transmission, the number of internal components is increased as the number of gear shift stages is increased, which may cause deterioration in terms of mountability, costs, weight and power transmission efficiency.

Therefore, in order to increase an effect of improving fuel efficiency by implementing an automatic transmission with multiple stages, it is important to develop a planetary gear train capable of maximizing efficiency using a small number of components.

In this respect, recently, an eight-speed automatic transmission has been implemented, and researches and developments are being actively conducted on a planetary gear train that may implement gear shift stages for eight or more speeds.

However, in the case of the recent eight-speed automatic transmission, a span of a gear shift ratio is maintained at a level of 6.5 to 7.5, and as a result, there is a problem in that the recent eight-speed automatic transmission has no great effect of improving fuel efficiency.

In a case in which a span of a gear shift ratio in the eight-speed automatic transmission is increased to the level of 9.0 or more, because it is impossible to ensure linearity of step ratios between gear shift stages, driving efficiency of the engine and drivability of the vehicle deteriorate.

Accordingly, there is a need for development of a highly efficient automatic transmission with 9 or more forward speed stages.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle that improves power delivery performance and fuel efficiency and ensures linearity of step ratios between transmission steps by increasing a span of gear ratios while realizing at least nine forward speed stages and at least one reverse speed stage by using a minimum number of constituent elements.

A planetary gear train of an automatic transmission for vehicles according to the present invention includes an input shaft receiving power of an engine; an output shaft outputting shifted power; a first planetary gear set having first, second, and third rotation elements; a second planetary gear set having fourth, fifth, and sixth rotation elements; a third planetary gear set having seventh, eighth, and ninth rotation elements; a fourth planetary gear set having tenth, eleventh, and twelfth rotation elements; and six control elements disposed at a portion selectively connecting the rotation elements and the rotation elements or a portion selectively connecting the rotation elements and the transmission housing, wherein the input shaft is continuously connected to the third rotation element, the output shaft is continuously connected to the eleventh rotation element, the second rotation element is continuously connected to the eleventh rotation element, the third rotation element is continuously connected to the fourth rotation element, the sixth rotation element is continuously connected to the eighth rotation element, the ninth rotation element is continuously connected to the tenth rotation element, the fifth rotation element is selectively connected to the transmission housing, while three control elements of the seven control elements are operated, at least nine forward speed stages and at least one reverse speed stage are implemented.

The seventh rotation element may be selectively connected to the transmission housing, the twelfth rotation element may be selectively connected to the transmission housing, the input shaft may be selectively connected to the fifth rotation element, the fifth rotation element may be selectively connected to the ninth rotation element, and the first rotation element may be selectively connected to the twelfth rotation element.

The first, second, and third rotation elements of the first planetary gear set may be a sun gear, a planet carrier, and a ring gear, respectively, the fourth, fifth, and sixth rotation elements of the second planetary gear set may be a sun gear, a planet carrier, and a ring gear, respectively, the seventh, eighth, and ninth rotation elements of the third planetary gear set may be a sun gear, a planet carrier, and a ring gear, and the tenth, eleventh, and twelfth rotation elements of the fourth planetary gear set may be a sun gear, a planet carrier, and a ring gear.

The planetary gear train according to an exemplary embodiment of the present invention may implement the gear shift stages for nine forward speed stages and one reverse speed stage by combining four planetary gear sets with the six control elements.

In addition, a span of a gear shift ratio is 9.0 or more, thereby maximizing driving efficiency of the engine.

In addition, the linearity of the interstage ratio of the shift stage is secured while multi-staging the shift stage at high efficiency, thereby making it possible to improve drivability such as acceleration before and after the shift, an engine speed rhythmic sense, and the like.

Further, effects that can be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each of transmission steps of respective control elements applied to the planetary gear train according to the first exemplary embodiment of the present invention.

Figure 1:
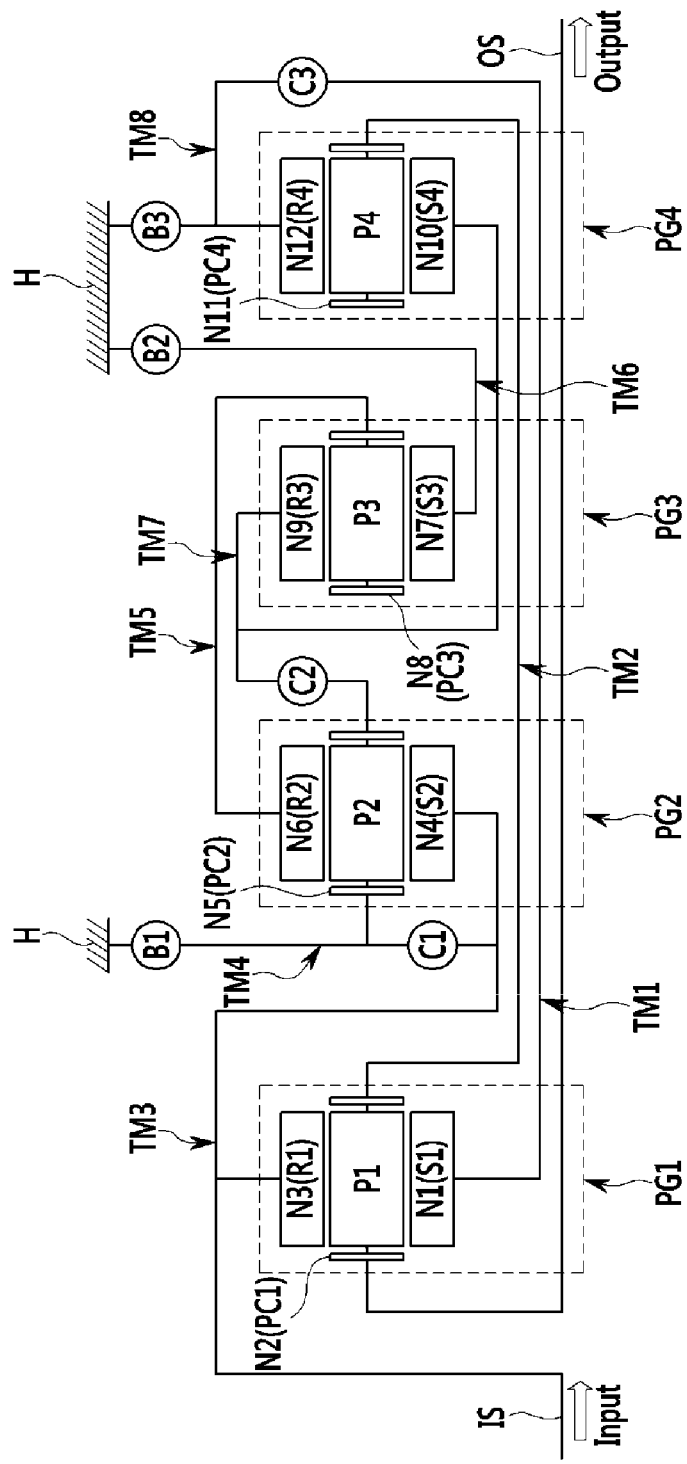
FIG. 1 is a configuration diagram of a planetary gear train according to a first exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

However, parts which are not related with the description are omitted for clearly describing the exemplary embodiment of the present invention, and like reference numerals refer to like or similar elements throughout the specification.

In the following description, dividing names of components into first, second, and the like is to divide the names because the names of the components are the same as each other, and an order thereof is not particularly limited.

FIG. 1 is a configuration diagram of a planetary gear train according to a first exemplary embodiment of the present invention.

Referring to FIG. 1, the planetary gear train according to an exemplary embodiment of the present invention includes first, second, third, fourth planetary gear sets PG1, PG2, PG3, and PG4 disposed on the same axis, an input shaft IS, an output shaft OS, eight rotation shafts TM1 to TM8 directly connecting to each other through respective rotation elements of the first, second, third, and fourth planetary gear sets PG1, PG2, PG3, and PG4, six control elements C1-C3 and B1-B3, and a transmission housing H.

As a result, torque input from the input shaft IS is transmitted by an inter-complementation operation of the first, second, third, and fourth planetary gear sets PG1, PG2, PG3, and PG4 to be output through the output shaft OS.

The respective simple planetary gear sets are disposed in a sequence of the first, second, third, and fourth planetary gear sets PG1, PG2, PG3, and PG4 from an engine side.

The input shaft IS is an input member, and rotational power from a crankshaft of an engine is torque-converted through a torque converter to be input into the input shaft IS.

The output shaft OS is an output member, is disposed on the same axis as the input shaft IS, and transfers transmitted driving torque to a driving shaft through a differential apparatus.

The first planetary gear set PG1 is a single pinion planetary gear set, and includes rotation elements including a first sun gear S1 which is a first rotation element N1, a first planet carrier PC1 which is a second rotation element N2 for supporting a first pinion P1 that externally engages with the first sun gear S1 that is the first rotation element N1, and a first ring gear R1 which is a third rotation element N3 that internally engages with the first pinion P1.

The second planetary gear set PG2 is a single pinion planetary gear set, and includes a second sun gear S2 which is a fourth rotation element N4, a second planet carrier PC2 which is a fifth rotation element N5 for supporting a second pinion P2 that externally engages with the second sun gear S2 that is the fourth rotation element N4, and a second ring gear R2 which is a sixth rotation element N6 that internally engages with the second pinion P2.

The third planetary gear set PG3 is a single pinion planetary gear set, and includes a third sun gear S3 which is a seventh rotation element N7, a third planet carrier PC3 which is an eighth rotation element N8 for supporting a third pinion P3 that externally engages with the third sun gear S3 that is the seventh rotation element N7, and a third ring gear R3 which is a ninth rotation element N9 that internally engages with the third pinion P3.

The fourth planetary gear set PG4 is a single pinion planetary gear set and includes a fourth sun gear S4 which is a tenth rotation element N10, a fourth planet carrier PC4 which is an eleventh rotation element N11 for supporting a fourth pinion P4 that externally engages with the fourth sun gear S4 that is the tenth rotation element N10, and a fourth ring gear R4 which is a twelfth rotation element N12 that internally engages with the fourth pinion P4.

The first, second, third, and fourth planetary gear sets PG1, PG2, PG3, and PG4 are operated while retaining the total of eight rotating shafts TM1 to TM8 in a state in which the second rotation elements N2 is directly connected to the eleventh rotation elements N11, the third rotation elements N3 is directly connected to the fourth rotation elements N4, the sixth rotation elements N6 is directly connected to the eighth rotation elements N8, and the ninth rotation elements N9 is directly connected to the tenth rotation elements N10.

Also, the first, second, third, fourth planetary gear sets PG1, PG2, PG3, and PG4 are all disposed on the output shaft OS by the connection configurations.

The configurations of the eight rotating shafts TM1 to TM8 will be described below.

The first rotation shaft TM1 includes a first rotation element N1 (a first sun gear S1).

The second rotation shaft TM2 includes a second rotation element N2 (a first planetary carrier PC1) and an eleventh rotation element N11 (a fourth planetary carrier PC4) and is directly connected to the output shaft OS so as to continuously be operated as an output element.

The the third rotation shaft TM3 includes a third rotation element N3 (a first ring gear R1) and a fourth rotation element N4 (a second sun gear S2) and is directly connected to the input shaft IS so as to continuously be operated as an input element.

The fourth rotation shaft TM4 includes a fifth rotation element N5 (a second planetary carrier PC2) and is selectively connected to the third rotation shaft TM3 and simultaneously is selectively connected to the transmission housing H.

The fifth rotation shaft TM5 includes a sixth rotation elements N6 (a second ring gear R2) and an eighth rotation element N8 (a third planetary carrier PC3).

The sixth rotation shaft TM6 includes a seventh rotation elements N7 (a third sun gear S3) and is selectively connected to the transmission housing H.

The seventh rotation shaft TM7 includes a ninth rotation element N9 (a third ring gear R3) and is selectively connected to the fourth rotation shaft TM4.

The eighth rotation shaft TM8 includes a twelfth rotation element N12 (a fourth ring gear R4) and is selectively connected to the first rotation shaft TM1 and simultaneously is selectively connected to the transmission housing H.

Further, three clutches C1, C2, and C3, which are control elements, are disposed at portions where the rotating shafts of the rotating shafts TM1 to TM8 are selectively connected to each other.

In addition, three brakes B1, B2, and B3, which are control elements, are disposed at portions where the rotating shafts of the rotating shafts TM1 to TM8 are selectively connected with the transmission housing H.

The arrangement positions of the six control elements C1-C3 and B1-B3 will be described below.

The first clutch C1 is disposed between the third rotation shaft TM3 and the fourth rotation shaft TM4 to allow the third rotation shaft TM3 to the fourth rotation shaft TM4 to be selectively integrated with each other.

The second clutch C2 is disposed between the fourth rotation shaft TM4 and the seventh rotation shaft TM7 to allow the fourth rotation shaft TM4 and the seventh rotation shaft TM7 to be selectively integrated with each other.

The third clutch C3 is disposed between the first rotation shaft TM1 and the eighth rotation shaft TM8 to allow the first rotation shaft TM1 and the eighth rotation shaft TM8 to be selectively integrated with each other.

The first brake B1 is interposed between the fourth rotational shaft TM4 and the transmission housing H to allow the fourth rotational shaft TM4 to be operated as a selective fixing element.

The second brake B2 is interposed between the sixth rotational shaft TM6 and the transmission housing H to allow the sixth rotational shaft TM6 to be operated as the selective fixing element.

The third brake B3 is interposed between the eighth rotational shaft TM8 and the transmission housing H to allow the eighth rotational shaft TM8 to be operated as the selective fixing element.

The respective control elements including the first, second, and third clutches C1, C2, and C3, and the first, second, and third brakes B1, B2, and B3 may be formed of a multi-plate type hydraulic friction coupling unit which is frictionally coupled by hydraulic pressure.

FIG. 2 is an operation table for each of transmission steps of respective control elements applied to the planetary gear train according to the first exemplary embodiment of the present invention.

As shown in FIG. 2, the planetary gear train according to the exemplary embodiment of the present invention is shifted while three control elements are operated in each shift stage.

The second clutch C2 and the second and third brakes B2 and B3 are simultaneously operated at the first forward speed stage D1. Therefore, in a stage in which the fourth rotation shaft TM4 is connected to the seventh rotation shaft TM7 to each other by the operation of the second clutch C2, the power is inputted to the third rotation shaft TM3, while the sixth rotation shaft TM6 and the eighth rotation shaft TM8 are operated as a fixing element by the operation of the second, third brakes B2 and B3, the shift is realized into the first forward speed and the power is output through the output shaft OS including the second rotation shaft TM2.

The first and second clutches C1 and C2 and the third brake B3 are simultaneously operated in the second forward speed stage D2. Therefore, in a stage in which the third rotation shaft TM3 is connected to the fourth rotation shaft TM4 to each other by the operation of the first clutch C1 and the fourth rotation shaft TM4 is connected to the seventh rotation shaft TM7 to each other by the operation of the second clutch C2, the power is inputted to the third rotation shaft TM3, while the eighth rotation shaft TM8 is operated as a fixing element by operation of the third brake B3, the shift is realized into the second forward speed and the power is output through the output shaft OS including the second rotation shaft TM2.

The first clutch C1 and the second and third brakes B2 and B3 are simultaneously operated in the third forward speed stage D3. Therefore, in a state in which the third rotation shaft TM3 is connected to the fourth rotation shaft TM4 by the operation of the first clutch C1, the power is inputted to the third rotation shaft TM3, while the sixth rotation shaft TM6 and the eighth rotation shaft TM8 are operated as a fixing element by the operation of the second and third brakes B2 and B3, the shift is realized into the three forward speed and the power is output through the output shaft OS including the second rotation shaft TM2.

The first and third clutches C1 and C3 and the third brake B3 are simultaneously operated in the fourth forward speed stage D4. Therefore, in a stage in which the third rotation shaft TM3 is connected to the fourth rotation shaft TM4 to each other by the operation of the first clutch C1 and the first rotation shaft TM1 is connected to the eighth rotation shaft TM8 to each other by the operation of the third clutch C3, the power is inputted to the third rotation shaft TM3, while the eighth rotation shaft TM8 is operated as a fixing element by the operation of the third brake B3, the shift is realized into the fourth forward speed and the power is output through the output shaft OS including the second rotation shaft TM2.

The first and third clutches C1 and C3 and the second brake B2 are simultaneously operated at the fifth forward speed stage D5. Therefore, in a stage in which the third rotation shaft TM3 is connected to the fourth rotation shaft TM4 to each other by the operation of the first clutch C1 and the first rotation shaft TM1 is connected to the eighth rotation shaft TM8 to each other by the operation of the third clutch C3, the power is inputted to the third rotation shaft TM3, while the sixth rotation shaft TM6 is operated as a fixing element by the operation of the second brake B2, the shift is realized into a fifth forward speed and the power is output through the output shaft OS including the second rotation shaft TM2.

The first, second, and third clutches C1, C2, and C3 are simultaneously operated at a sixth forward speed stage D6. Therefore, the third rotation shaft TM3 is connected to the fourth rotation shaft TM4 to each other by the operation of the first clutch C1 and the fourth rotation shaft TM4 is connected to the seventh rotation shaft TM7 to each other by the operation of the second clutch C2, and the first rotation shaft TM1 is connected to the eighth rotation shaft TM8 to each other by the operation of the third clutch C3, thereby forming a stage in which the first, second, third, and fourth planetary gear sets PG1, PG2, PG3, and PG4 are all directly connected, the input into the third rotation shaft TM3 is output through the output shaft OS including the second rotation shaft TM2 as it is.

The second and third clutches C2 and C3 and the second brake B2 are simultaneously operated at a seventh forward speed stage D7. Therefore, in a state in which the fourth rotation shaft TM4 is connected to the seventh rotation shaft TM7 to each other by the operation of the second clutch C2 and the first rotation shaft TM1 is connected to the eighth rotation shaft TM8 to each other by the operation of the third clutch C3, the power is inputted to the third rotation shaft TM3, while the sixth rotation shaft TM6 is operated as a fixing element by the operation of the second brake B2, the shift is realized into the seventh forward speed and the power is output through the output shaft OS including the second rotation shaft TM2.

The second and third clutches C2 and C3 and the first brake B1 are simultaneously operated at an eighth forward speed stage D8. Therefore, in a stage in which the fourth rotation shaft TM4 is connected to the seventh rotation shaft TM7 to each other by the operation of the second clutch C2 and the first rotation shaft TM1 is connected to the eighth rotation shaft TM8 to each other by the operation of the third clutch C3, the power is inputted to the third rotation shaft TM3, while the fourth rotation shaft TM4 is operated as a fixing element by the operation of the first brake B1, the shift is realized into the eighth forward speed and the power is output through the output shaft OS including the second rotation shaft TM2.

The third clutch C3 and the first and second brakes B1 and B2 are simultaneously operated at a ninth forward speed stage D9. Therefore, in a stage in which the first rotation shaft TM1 is connected to the eighth rotation shaft TM8 to each other by the operation of the third clutch C3, the power is inputted to the third rotation shaft TM3, while the fourth rotation shaft TM4 and the sixth rotation shaft TM6 are operated as a fixing element by the operation of the first and second brakes B1 and B2, the shift is realized into the ninth forward speed stage and the power is output through the output shaft OS including the second rotation shaft TM2.

The first, second, and third brakes B1, B2, and B3 are simultaneously operated at a reverse speed stage REV. Therefore, the power is inputted to the third rotation shaft TM3, while the fourth rotation shaft TM4, the sixth rotation shaft TM6, and the eighth rotation shaft TM8 are operated as a fixing element by the operation of the first, second, and third brakes B1, B2, and B3, the shift is realized into the reverse speed and the power is output through the output shaft OS including the second rotation shaft TM2.

The planetary gear train according to the exemplary embodiment of the present invention may implement the gear shift stages for nine forward speed stages and one reverse speed stage by operating and controlling the four planetary gear sets PG1, PG2, PG3, and PG4 using the three clutches C1, C2, and C3 and the three brakes B1, B2, and B3.

In addition, the linearity of the interstage ratio of the shift stage is secured while multi-staging the shift stage at high efficiency, thereby making it possible to improve drivability such as acceleration before and after the shift, an engine speed rhythmic sense, and the like.

In addition, a span of a gear shift ratio is 9.0 or more, thereby maximizing driving efficiency of the engine.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle comprising:
   an input shaft receiving power of an engine;
   an output shaft outputting shifted power;
   a first planetary gear set having a first rotation element, a second rotation element, and a third rotation element;
   a second planetary gear set having a fourth rotation element, a fifth rotation element, and a sixth rotation element;
   a third planetary gear set having a seventh rotation element, an eighth rotation element, and a ninth rotation element;
   a fourth planetary gear set having a tenth rotation element, an eleventh rotation element, and a twelfth rotation element; and
   six control elements, each of which selectively connects a corresponding pair among the input shaft, the output shaft, the first to twelfth rotation elements, and a transmission housing,
   wherein the input shaft is continuously connected to the third rotation element,
   wherein the output shaft is continuously connected to the eleventh rotation element,
   wherein the second rotation element is continuously connected to the eleventh rotation element,
   wherein the third rotation element is continuously connected to the fourth rotation element,
   wherein the sixth rotation element is continuously connected to the eighth rotation element,
   wherein the ninth rotation element is continuously connected to the tenth rotation element,
   wherein the fifth rotation element is selectively connected to the transmission housing, and
   wherein while three control elements of the six control elements are operated, at least nine forward speed stages and at least one reverse speed stage are implemented.

2. The planetary gear train of claim 1, wherein
the seventh rotation element is selectively connected to the transmission housing,
the twelfth rotation element is selectively connected to the transmission housing,
the input shaft is selectively connected to the fifth rotation element,
the fifth rotation element is selectively connected to the ninth rotation element, and
the first rotation element is selectively connected to the twelfth rotation element.

3. The planetary gear train of claim 1, wherein
the first rotation element, the second rotation element, and the third rotation element of the first planetary gear set are a sun gear, a planet carrier, and a ring gear, respectively,
the fourth rotation element, the fifth rotation element, and the sixth rotation element of the second planetary gear set are a sun gear, a planet carrier, and a ring gear, respectively,
the seventh rotation element, the eighth rotation element, and the ninth rotation element of the third planetary gear set are a sun gear, a planet carrier, and a ring gear, and
the tenth rotation element, the eleventh rotation element, and the twelfth rotation element of the fourth planetary gear set are a sun gear, a planet carrier, and a ring gear.

4. A planetary gear train of an automatic transmission for a vehicle comprising:
an input shaft receiving power of an engine;
an output shaft outputting shifted power;
a first planetary gear set having a first rotation element, a second rotation element, and a third rotation element;
a second planetary gear set having a fourth rotation element, a fifth rotation element, and a sixth rotation element;
a third planetary gear set having a seventh rotation element, an eighth rotation element, and a ninth rotation element; and
a fourth planetary gear set having a tenth rotation element, an eleventh rotation element, and a twelfth rotation element,
wherein the planetary gear train includes:
  a first rotation shaft including the first rotation element;
  a second rotation shaft directly connected to an output shaft including the second rotation element and the eleventh rotation element;
  a third rotation shaft including the third rotation element and the fourth rotation element and directly connected to the input shaft;
  a fourth rotation shaft including the fifth rotation element and selectively connected to the third rotation shaft and the transmission housing;
  a fifth rotation shaft including the sixth rotation element and the eighth rotation element;
  a sixth rotation shaft including the seventh rotation element and selectively connected to the transmission housing;
  a seventh rotation shaft including the ninth rotation element and the tenth rotation element and selectively connected to the fourth rotation shaft; and
  an eighth rotation shaft including a twelfth rotation element and selectively connected to the first rotation shaft and the transmission housing.

5. The planetary gear train of claim 4, wherein
the first planetary gear set is a single pinion planetary gear set in which the first rotation element is a first sun gear, the second rotation element is a first planet carrier, and the third rotation element is a first ring gear,
the second planetary gear set is a single pinion planetary gear set in which the fourth rotation element is a second sun gear, the fifth rotation element is a second planet carrier, and the sixth rotation element is a second ring gear,
the third planetary gear set is a single pinion planetary gear set in which the seventh rotation element is a third sun gear, the eighth rotation element is a third planet carrier, and the ninth rotation element is a third ring gear, and
the fourth planetary gear set is a single pinion planetary gear set in which the tenth rotation element is a fourth sun gear, the eleventh rotation element is a fourth planet carrier, and the twelfth rotation element is a fourth ring gear.

6. The planetary gear train of claim 4, further comprising:
a first clutch selectively connecting the third rotation shaft and the fourth rotation shaft;
a second clutch selectively connecting the fourth rotation shaft and the seventh rotation shaft;
a third clutch selectively connecting the first rotation shaft and the eighth rotation shaft;
a first brake selectively connecting the fourth rotation shaft and the transmission housing;
a second brake selectively connecting the sixth rotation shaft and the transmission housing; and
a third brake selectively connecting the eighth rotation shaft and the transmission housing.

7. The planetary gear train of claim 6, wherein
a first forward speed stage is performed by a simultaneous operation of the second clutch and the second and third brakes;
a second forward speed stage is performed by a simultaneous operation of the first and second clutch and the third brake;
a third forward speed stage is performed by a simultaneous operation of the first clutch and the second and third brakes;
a fourth forward speed stage is performed by a simultaneous operation of the first and third clutches and the third brake;
a fifth forward speed stage is performed by a simultaneous operation of the first and third clutches and the second brake;
a sixth forward speed stage is performed by a simultaneous operation of the first, second, and third clutches;
a seventh forward speed stage is performed by a simultaneous operation of the second and third clutches and the second brake;
an eighth forward speed stage is performed by a simultaneous operation of the second and third clutches and the first brake;
a ninth forward speed stage is performed by a simultaneous operation of the third clutch and the first and second brakes; and
a reverse speed stage by a simultaneous operation of the first, second, and third brakes.

8. A planetary gear train of an automatic transmission for a vehicle comprising:
an input shaft receiving power of an engine;
an output shaft outputting shifted power;
a first planetary gear set made of a single pinion planetary gear set and including a first rotation element, a second rotation element, and a third rotation element;

a second planetary gear set made of a single pinion planetary gear set and including a fourth rotation element, a fifth rotation element, and a sixth rotation element;

a third planetary gear set made of a single pinion planetary gear set and including a seventh rotation element, an eighth rotation element, and a ninth rotation element; and a fourth planetary gear set made of a single pinion planetary gear set and including a tenth rotation element, an eleventh rotation element, and a twelfth rotation element, wherein the planetary gear train includes a first rotation shaft including the first rotation element;

a second rotation shaft directly connected to an output shaft including the second rotation element and the eleventh rotation element;

a third rotation shaft including the third rotation element and the fourth rotation element and directly connected to the input shaft;

a fourth rotation shaft including the fifth rotation element and selectively connected to the third rotation shaft and a transmission housing;

a fifth rotation shaft including the sixth rotation element and the eighth rotation element;

a sixth rotation shaft including the seventh rotation element and selectively connected to the transmission housing;

a seventh rotation shaft including the ninth rotation element and the tenth rotation element and selectively connected to the fourth rotation shaft;

an eighth rotation shaft including a twelfth rotation element and selectively connected to the first rotation shaft and the transmission housing;

a first clutch selectively connecting the third rotation shaft and the fourth rotation shaft;

a second clutch selectively connecting the fourth rotation shaft and the seventh rotation shaft;

a third clutch selectively connecting the first rotation shaft and the eighth rotation shaft;

a first brake selectively connecting the fourth rotation shaft and the transmission housing;

a second brake selectively connecting the sixth rotation shaft and the transmission housing; and a third brake selectively connecting the eighth rotation shaft and the transmission housing.

9. The planetary gear train of claim 8, wherein the first rotation element is made of a first sun gear, the second rotation element is made of a first planet carrier, and the third rotation element is made of a first ring gear in the first planetary gear set, the fourth rotation element is made of a second sun gear, the fifth rotation element is made of a second planet carrier, and the sixth rotation element is made of a second ring gear, the seventh rotation element is made of a third sun gear, the eighth rotation element is made of a third planet carrier, and the ninth rotation element is made of a third ring gear in the third planetary gear set, and the tenth rotation element is made of a fourth sun gear, the eleventh rotation element is made of a fourth planet carrier, and the twelfth rotation element is made of a fourth ring gear in the fourth planetary gear set.

10. The planetary gear train of claim 8, wherein speed stages realized by the operation of the three clutches and the three brakes include a first forward speed stage by a simultaneous operation of the second clutch and the second and third brakes;

a second forward speed stage by a simultaneous operation of the first and second clutch and the third brake;

a third forward speed stage by a simultaneous operation of the first clutch and the second and third brakes;

a fourth forward speed stage by a simultaneous operation of the first and third clutches and the third brake;

a fifth forward speed stage by a simultaneous operation of the first and third clutches and the second brake;

a sixth forward speed stage by a simultaneous operation of the first, second, and third clutches;

a seventh forward speed stage by a simultaneous operation of the second and third clutches and the second brake;

an eighth forward speed stage by a simultaneous operation of the second and third clutches and the first brake;

a ninth forward speed stage by a simultaneous operation of the third clutch and the first and second brakes; and a reverse speed stage by a simultaneous operation of the first, second, and third brakes.

\* \* \* \* \*